United States Patent [19]

Totani

[11] Patent Number: 5,449,214

[45] Date of Patent: Sep. 12, 1995

[54] SAFETY SYSTEM FOR AN OCCUPANT OF AN AUTOMOTIVE VEHICLE

[76] Inventor: Hideo Totani, 1092-5 Hagiwara Hagiwara-cho, Mashita-gun Gifu-ken, Japan

[21] Appl. No.: 141,744

[22] Filed: Oct. 27, 1993

[51] Int. Cl.⁶ ............................................... B60N 2/42
[52] U.S. Cl. ............................... 296/68.1; 297/216.13; 297/216.15; 297/336; 297/354.11; 297/365
[58] Field of Search .................... 296/65.1, 68.1; 297/216.1, 216.13, 216.15, 216.19, 313, 335, 336, 354.11, 354.12, 364, 365; 180/274, 282

[56] References Cited

U.S. PATENT DOCUMENTS 2,335,340  11/1943  Koppelman ................... 296/68.1 X
5,125,598   6/1992  Fox ............................. 297/216.15 X Primary Examiner—Andrew C. Pike
Attorney, Agent, or Firm—Edwin E. Greigg; Ronald E. Greigg

[57] ABSTRACT

An occupant safety device for an automotive vehicle includes a seat including a seat and back cushion. The seat is supported by a pair of left and right supports oppositely provided on the left and right sides of the seat which are supported on the floor of the vehicle. The seat is supported in the front by opposite pins for a pivot motion of the seat cushion. A rotary cover plate is hinged at one end below the cushion and adapted to open an opening formed in the floor surface which permits the back portion of the seat to fall into the opening. The door is suported in a closed ordinary condition by means of a locking pin of a locking pin mechanism. The seat back is supported on the supports and hinged at the upper end and supported at the lower end by opposite lock pin members which when a collision occurs the pins release the seat so that the seat is hinged at its upper end. A Central Processing Unit (CPU) sends a signal for releasing, in a moment, the locking pin of the locking pin mechanism for the seat cushion and the lock member of the lock mechanism for the back cushion on the basis of a detection signal from a collision detector at the time of collision of the automotive vehicle. Thus the seat and back cushion is operative so that the occupant bends in the middle for protection from the collision.

4 Claims, 10 Drawing Sheets

Fig. 4
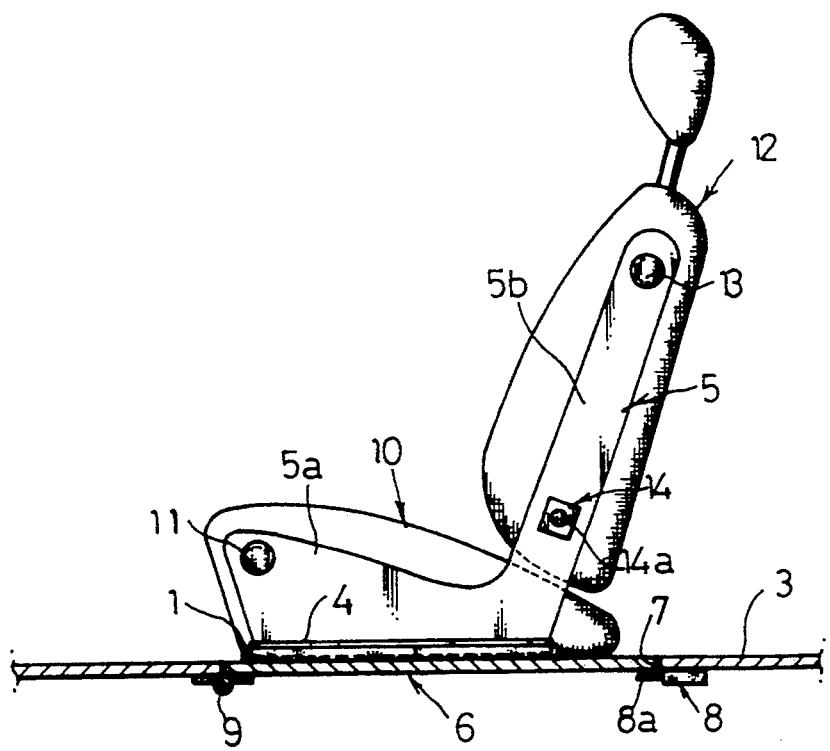
Fig. 5
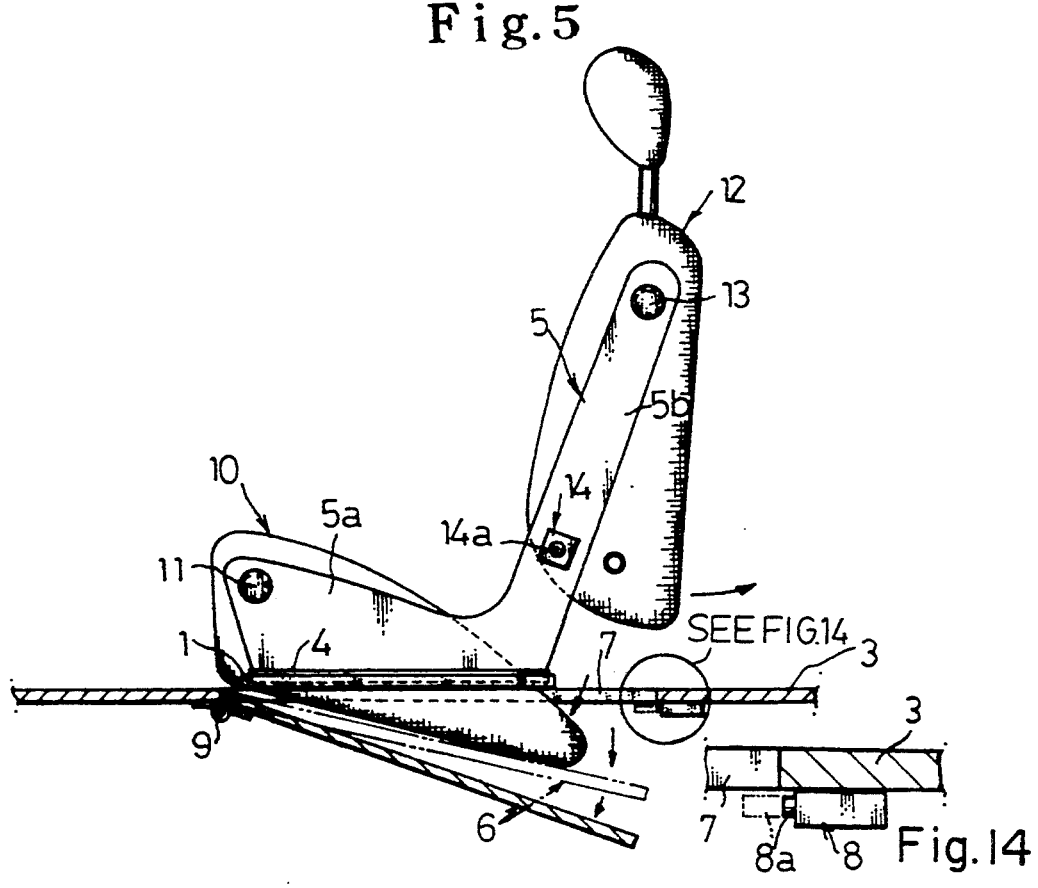
Fig. 14

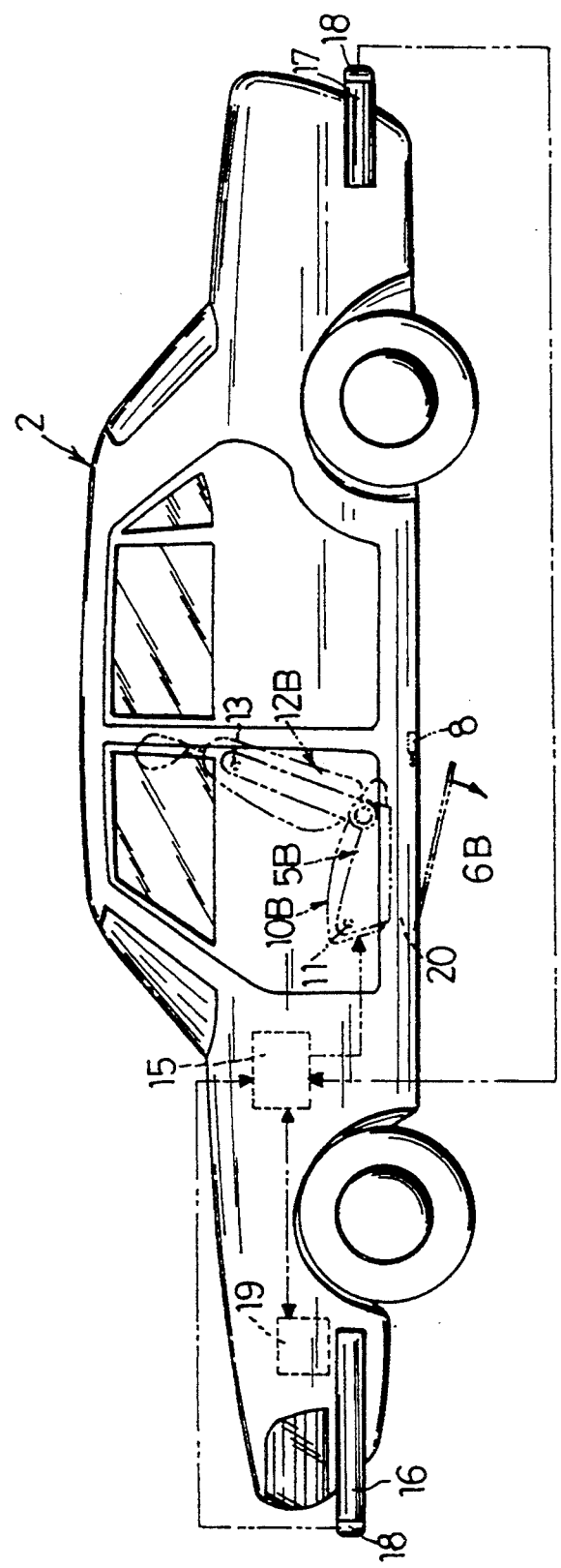

SAFETY SYSTEM FOR AN OCCUPANT OF AN AUTOMOTIVE VEHICLE

BACKGROUND OF THE INVENTION

1. Field of the Invention

This invention relates to an occupant safety device for an automotive vehicle adapted for protecting an occupant the time of a collision or crash of an automotive vehicle.

2. Description of the Prior Art

Hitherto, as a device for protecting an occupant (including a driver as well) of an automotive vehicle from a crash (collision) or accident, an air bag system has been developed. For example, in the Japanese Patent Application Laid Open No. 122751/1989, a plurality of straps are connected with a predetermined spacing between an inside of a bag body, and reinforcing clothes are provided at the connecting portions.

Thus, while the air bag system of this kind has merit in that a compressed high pressure gas incisively or vehemently flows from a bag mounting hole the moment a collision or accident of an automotive vehicle takes place, thereby making it possible to protect an occupant, it had the drawback that such a high pressure gas may leak from the connecting portion or that a connecting portion may be broken depending upon circumstances. In addition, such an air bag system had the problem that even if it is put to practical use, it is very expensive.

SUMMARY OF THE INVENTION

In view of the drawbacks of an air bag system as described above, an object of this invention is to provide an occupant safety device for an automotive vehicle which can securely protect an occupant from a collision or accident, and which can be put to practical use at a low cost.

To achieve the above-mentioned object, there is provided an occupant safety device for an automotive vehicle, comprising: seat risers oppositely provided on the floor surface of an automotive vehicle; a pair of left and right supports provided on the left and right sides through slides adapted to engage with the seat risers and disengage therefrom; a rotary cover plate to which the seat is secured and adapted to recede into an opening formed in the floor surface between these supports to be closed in an ordinary normal operating condition by means of a seat locking pin of a seat locking mechanism; a seat including a cushion supported by the rotary cover plate and adapted so that the front side of the seat is axially supported by the supports; a seat back axially supported by the left and right supports and adapted to be locked by a lock member of a lock mechanism; and a Central Processing Unit (CPU) for releasing, in a moment, the seat locking pin of the seat locking mechanism and the lock member of the lock mechanism on the basis of a detection signal from a collision detector upon a collision of an automotive vehicle.

In place of the above-mentioned configuration, there may be employed a configuration such that a required space is provided between the seat cushion and the rotary fall cover plate, that the front side of the seat cushion is axially supported by the supports, and that the back side of the seat cushion is locked by the lock member of the lock mechanism.

In addition, there may be employed a configuration such that a recessed portion is formed at the floor surface between a pair of left and right supports, that the seat cushion is caused to be positioned through the supports above the recessed portion, that the front side of the seat cushion is axially supported by the supports, and that the back side of the seat cushion is locked by the lock member of the lock mechanism.

In operation, when an automotive vehicle collides with an obstacle, etc., collision detectors detects its impact force. These detection signals are sent to the CPU having, as a power source, a battery mounted in the vehicle. From the CPU, a release signal is sent to the locking pin mechanism and the lock mechanism.

Thus, the locking pin of the locking pin mechanism and the lock member of the lock mechanism are respectively released in a moment, so the rotary cover plate rotates in a downward direction. As a result, the seat cushion rotates in the downward direction following the rotary cover plate. Also, the seat back rotates in a backward direction by pressure of occupant.

BRIEF DESCRIPTION OF THE DRAWINGS

FIG. 4 illustrates a side view of the safety seat with the safety seat in a normal operating position;

FIG. 5 illustrates a side view of the safety seat in the position after the locking mechanisms have been activated as if a collision has occurred;

FIG. 6 is a modification of the safety seat shown in FIG. 1 with the safety seat, battery and CPU shown in phantom; the seat support is also shown in an open position;

FIG. 14 is an enlargement of one of the locking pin mechanisms that locks the seat in a normal operating position and which releases the seat subsequent to a collision.

DESCRIPTION OF THE PREFERRED EMBODIMENTS

Figure 1:
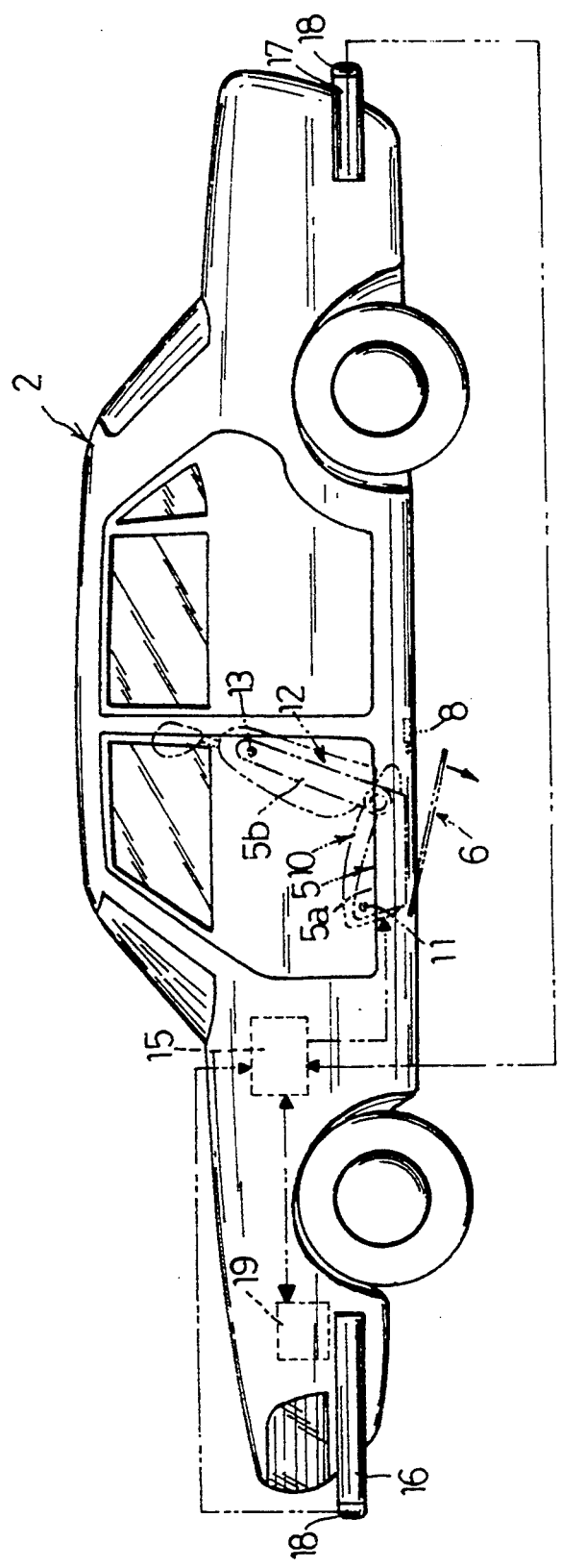
FIG. 1 illustrates a vehicle with the safety seat battery and CPU shown in phantom.
Figure 2:
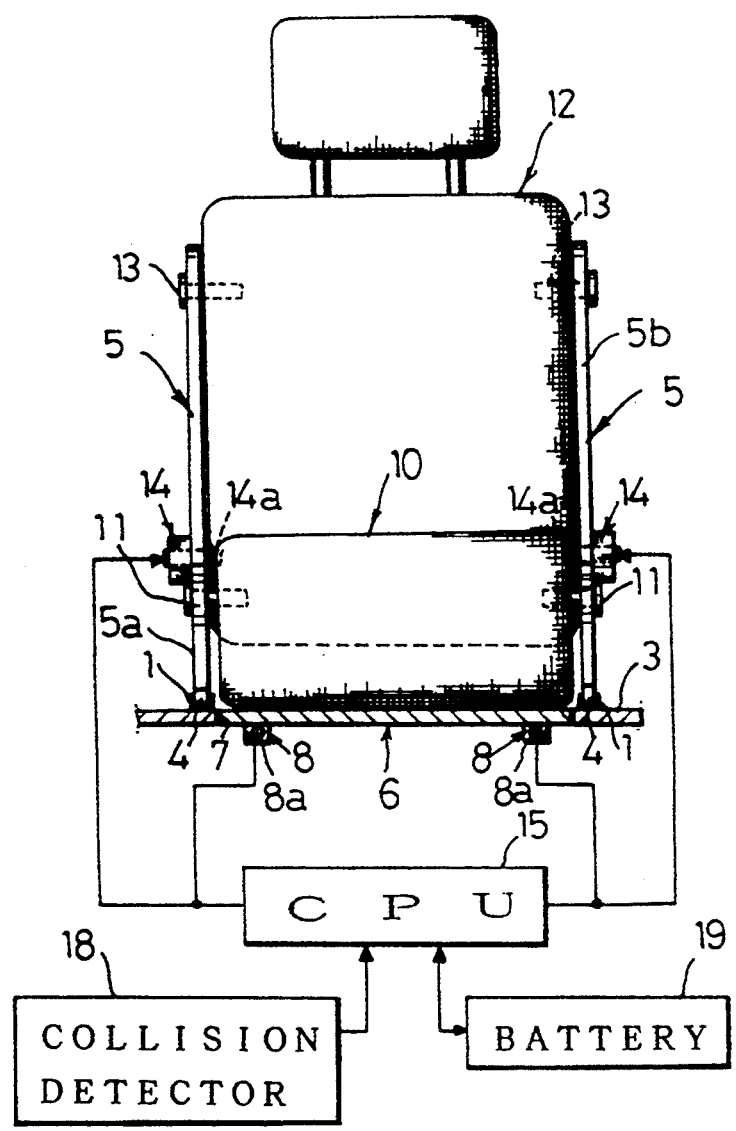
FIG. 2 illustrates a front view of the safety seat with the CPU, battery and collision detector shown in box form.
Figure 3:
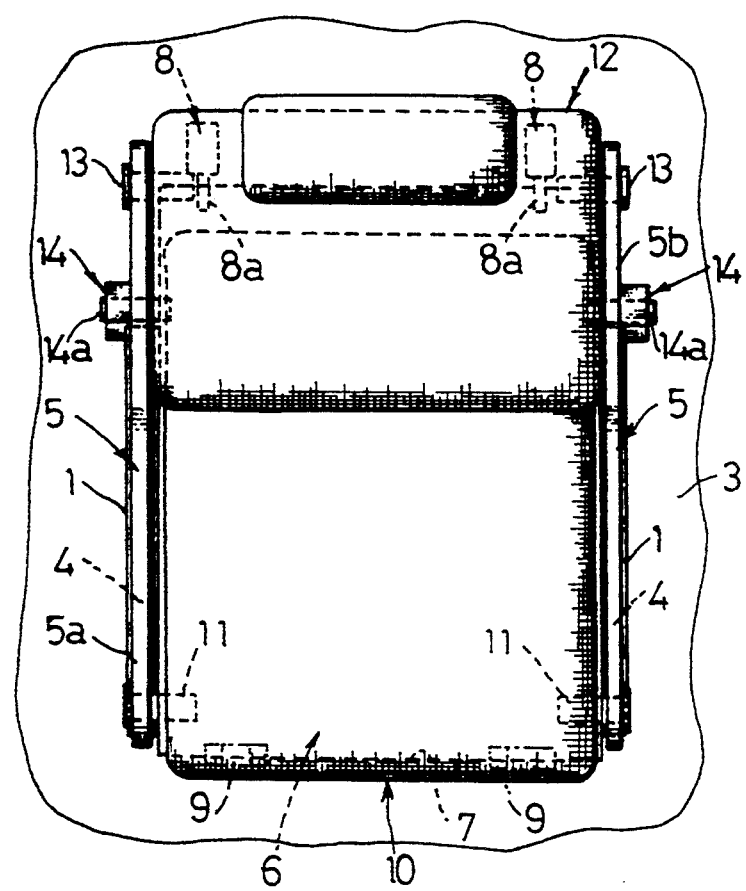
FIG. 3 is a top view illustrating the locking pin mechanism in phantom.
Figure 7:
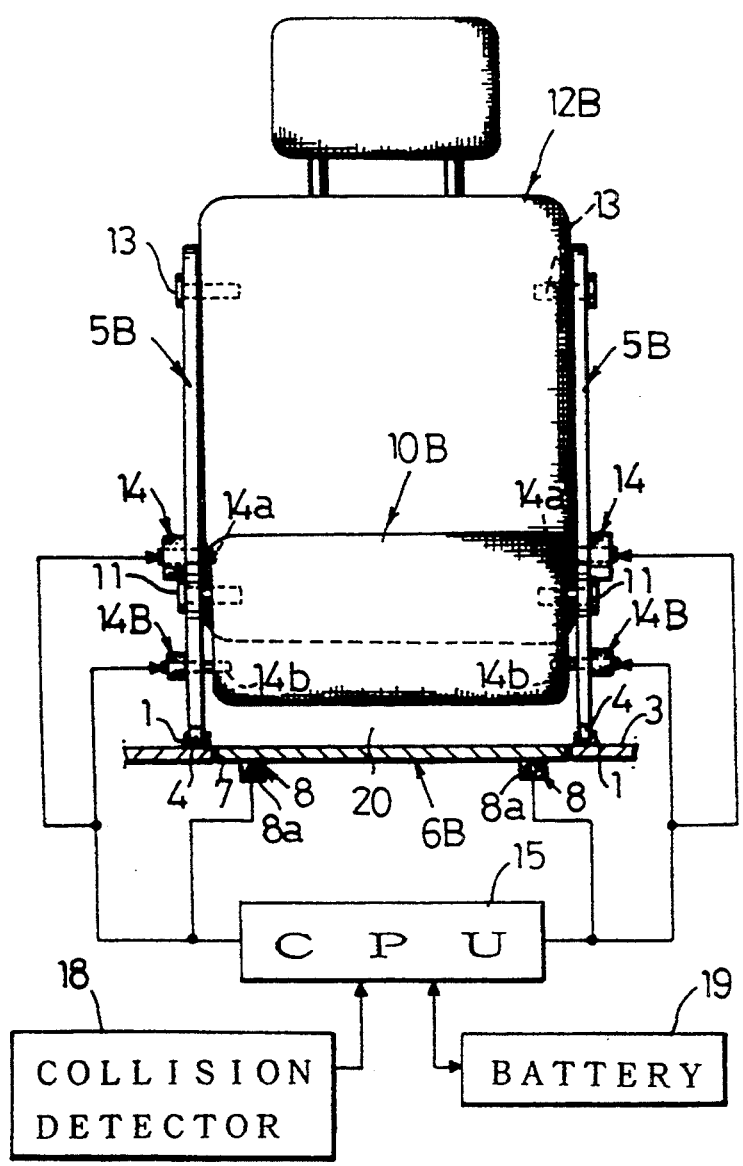
FIG. 7 is a front view of the safety seat shown in FIG. 6.

Preferred embodiments of this invention will now be described with reference to the attached drawings.

Explanation will be first given in connection with a first embodiment of an occupant safety device for an automotive vehicle according to this invention.

In FIGS. 1 to 5 and 14, reference numeral 1 denotes a pair of left and right seat support risers oppositely provided to support the seat with the seat risers secured to a floor surface 3 of an automotive vehicle 2. It is desirable that the pair of left and right seat risers 1 are formed so as to take a shape of an elongated rod to some extent because of necessity of supporting supports or support members which will be described later.

Reference numeral 4 denotes an angle iron strip adapted to engage with the seat risers 1 and disengage therefrom and adapted so that they are fixed on the lower surfaces of left and right supports 5.

Reference numeral 5 denotes a pair of left and right supports oppositely provided on the, left and right sides, and secured to the angle iron strips 4. Each support 5 is composed of, as shown in FIG. 4, a cushion supporting portion 5a which is secured to the angle iron strip 4 and a back supporting portion 5b integral with the supporting portion 5a in an oblique direction. As a whole, each support is formed to be L-shaped.

Reference numeral 6 denotes a rotary cover plate upon which the seat cushion is seated which is adapted to allow an opening 7 formed in the floor surface 3 between these supports 5, 5 to be closed in an ordinary condition by a pair of locking pins 8a of a pair of locking pin mechanisms 8. This rotary cover plate 6 is attached on the floor surface 3 through a hinge 9 as shown in FIGS. 4 and 5. In addition, the locking pin mechanism 8 uses a small hydraulic unit or a small hydraulic cylinder for operating the locking pin. Accordingly, the locking pin 8a serves as an operating rod of the hydraulic cylinder in this embodiment, as shown in FIG. 14.

Reference numeral 10 denotes a seat cushion supported by the rotary cover plate 6 and adapted so that the front side thereof is axially supported by the supports 5 through a pair of cushion shafts 11.

Reference numeral 12 denotes a seat back adapted so that the upper side thereof is axially supported by the left and right supports 5, 5 through a pair of back shafts 13, and adapted to be locked in a normal operating position by lock members 14a a of lock mechanisms 14, one on each side of the back cushion. As the lock mechanism 14, an electromagnetic valve is used. These electromagnetic valves are suitably attached on the lower portions of the back supporting portions 5b of the left and right supports 5, 5, respectively.

Reference numeral 15 denotes a Central Processing Unit (CPU) for releasing, in a moment, the locking pins 8a of the locking pin mechanisms 8 and the lock members 14a of the lock mechanisms 14 on the basis of detection signals from a plurality of collision detectors 18 attached at the front and back portions of an automotive vehicle, e.g., bumpers 16, 17 when the automotive vehicle 2 collides with any obstacle, etc. Additionally, reference numeral 19 denotes a battery mounted in the automotive vehicle. Respective operations of the locking pin mechanisms 8 and the lock mechanisms 14 are carried out by using this battery, as a power supply.

In the above-mentioned configuration, when the automotive vehicle 2 collides with any obstacle, etc., the collision detectors 18 detect its impact force. Thus, these detection signals are sent to the CPU 15, and a release signal is immediately sent from the CPU 15 to the locking pin mechanisms 8 and the lock mechanisms 14.

Thus, the locking pins 8a of the locking pin mechanisms 8 and the lock members 14a of the lock mechanisms 14 are respectively released in a moment. As a result, the rotary cover plate 6 rotates in a lower direction with a hinge 9 being as a fulcrum by weight of the occupant himself as shown in FIG. 5A. At this time, the seat cushion 10 rotates following the rotary cover plate 6 with the cushion shafts 11 serving as a fulcrum. Also, the seat back 12 rotates in a backward direction by pressure of the crew with back shafts 13 serving as a fulcrum.

Accordingly, the occupant (e.g., a driver) is brought into the state where his upper body is bent forward with his waist being depressed downward.

Different embodiments of this invention are shown in FIGS. 6 to 13 which will now be described.

It is to be noted that, in the explanation of these embodiments, the same reference numerals are respectively attached to the same portions of the above-described first embodiment of this invention, and their repetitive explanation is omitted here.

The second embodiment shown in FIGS. 6 to 9 mainly differ from the above-described first embodiment in that a required space 20 is provided between a seat cushion 10B and a rotary cover plate 6B, and that the front side of the seat cushion 10B is axially supported by supports 5B, and the back (rear) side of the seat cushion 10B is locked by second lock members 14b of lock mechanisms 14B.

Figure 8:
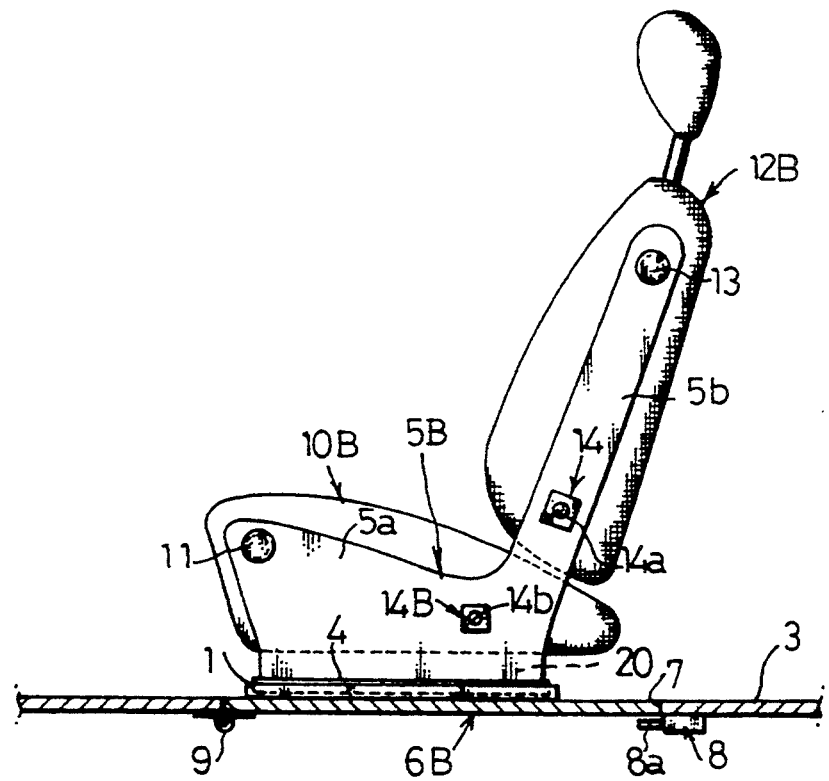
FIG. 8 is a side view of the safety seat shown in FIG. 6.
Figure 9:
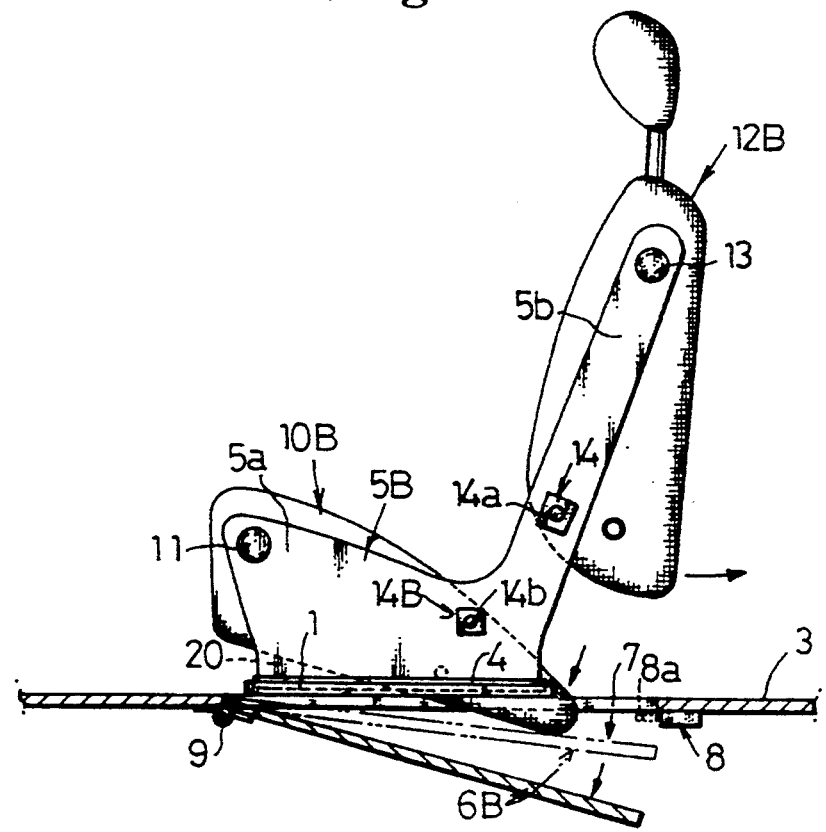
FIG. 9 is a side view of the safety seat shown in FIG. 8 with the safety seat in a position subsequent to a collision.
Figure 10:
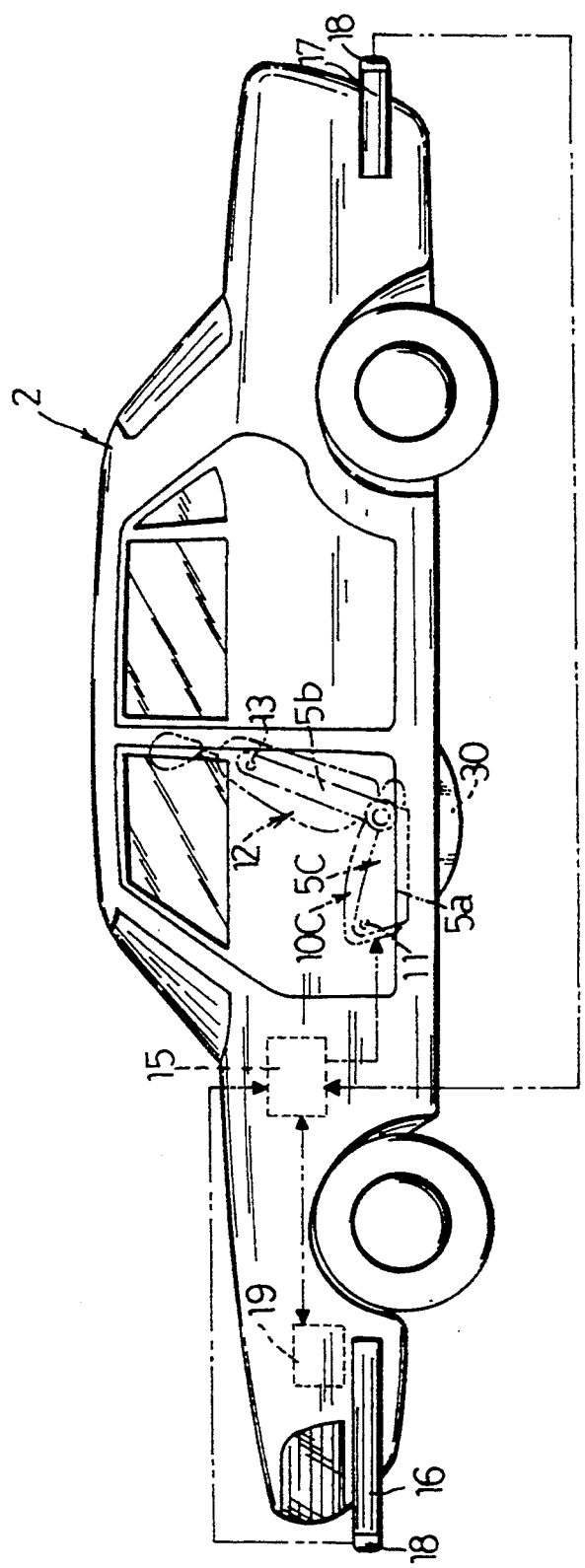
FIG. 10 illustrates a further modification of the safety seat shown in FIGS. 1 and 6.
Figure 11:
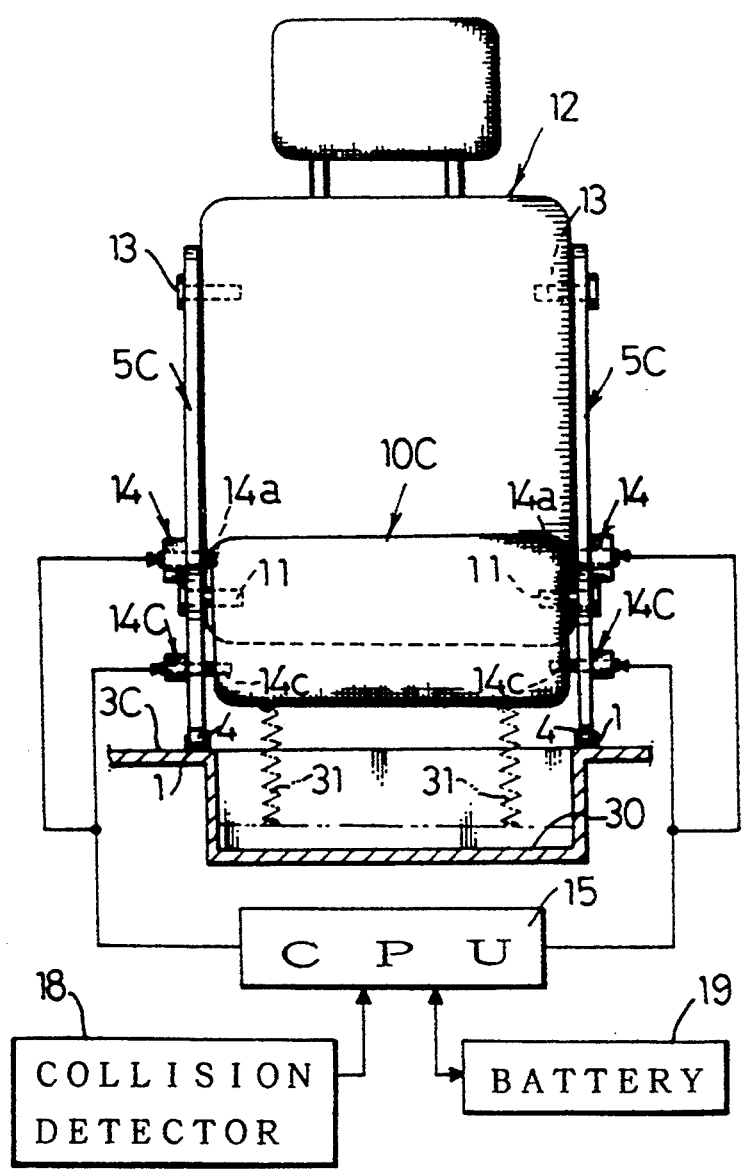
FIG. 11 illustrates a front view of the modification shown in FIG. 10.
Figure 12:
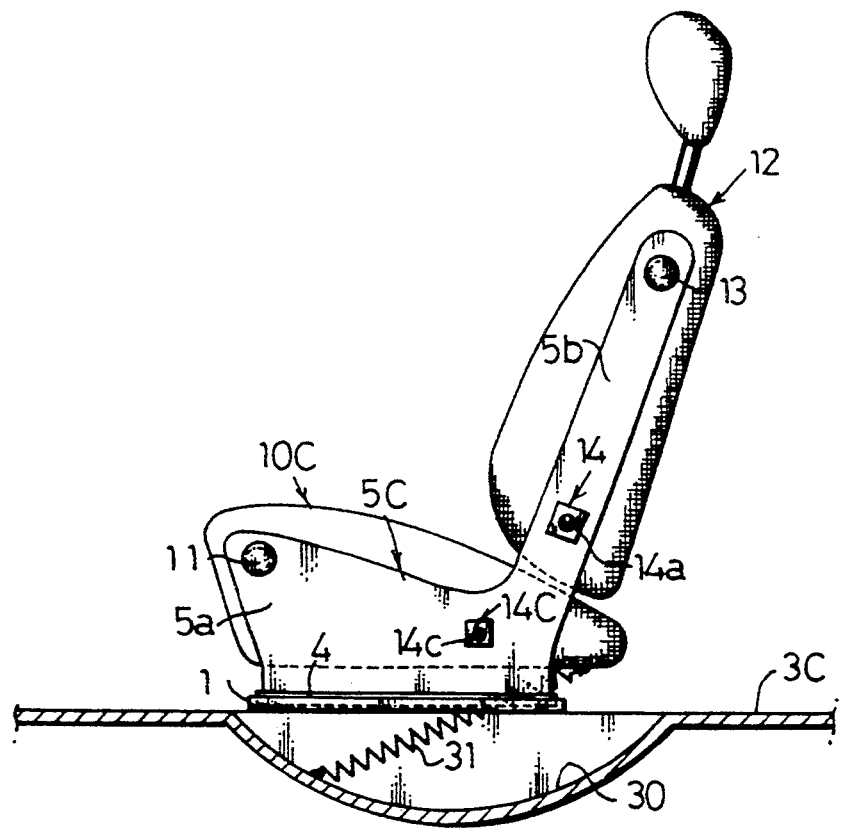
FIG. 12 illustrates a side view of the modification shown in FIG. 10.

Also in the case where the occupant safety device for an automotive vehicle is constituted in this way, the seat cushion 10B is supported at the front by cushion shafts 11 and supported at the back by lock members 14b. When the locking pin mechanism 8 and the lock mechanism 14B are operated, the rotary cover plate 6B and the seat back 12B respectively rotate as shown in FIGS. 8 and 9. Thus, effects and advantages similar to the above-described first embodiment can be provided.

The third embodiment shown in FIGS. 10 to 13 mainly differs from the above-described respective embodiments in that a recessed portion 30 is formed at a floor surface 3C between a pair of left and right supports 5C, 5C, the seat cushion 10C is caused to be positioned above the recessed portion 30, the front side of the seat cushion 10C is axially supported by the supports 5C, 5C, via cushion shafts and the back side of the seat cushion 10C is locked by second lock members 14c of lock mechanisms 14C; and that the seat cushion 10C is biased in a rotational direction of the seat cushion 10C in an ordinary condition by a plurality of spring members 31 having one end portion attached to the lower surface of the back of the seat cushion and the other end portion attached to the front side of the recessed portion.

Figure 13:
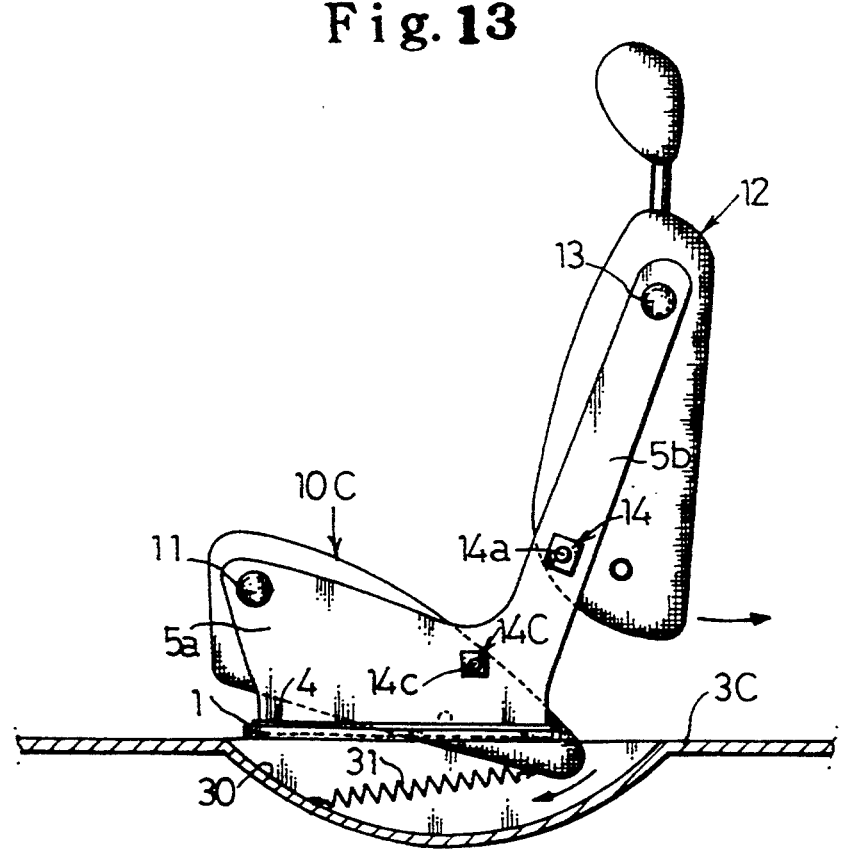
FIG. 13 illustrates the modification shown in FIGS. 10–12 in an activated position subsequent to a collision.

In the above-mentioned configuration, when an automotive vehicle collides with an obstacle, etc., the seat cushion 10C rotates, in a moment, by the weight of the occupant himself and a spring force of the spring members as shown in FIG. 13. Thus, effects and advantages similar to those of the above-described first embodiment can be provided.

As is clear from the foregoing description, advantages as recited below are provided in this invention.

(1) When an automotive vehicle collides with an obstacle, etc., the seat cushion rotates in a moment following the rotary cover plate or independently thereof, and the seat back also rotates in a moment at the same time. Accordingly, the occupant (e.g., driver) is brought into the state where his upper body is bent forward with his waist being depressed downward. Therefore, this occupant safety device makes it possible to securely protect the occupant from the collision accident.

(2) Since this occupant safety device is realized by improving the floor surface of an automotive vehicle or the support member for supporting seat cushion, etc., it can be put to practical use at a low cost.

What is claimed is:

1. A safety system for an occupant of an automotive vehicle which comprises a floor, said system comprising: a seat cushion (10, 10B, 10C); a separate back cushion (12); a pair of oppositely disposed side supports which support said seat cushion and said back cushion, each of said side supports having a approximate L-shape having a first portion secured to the floor of the vehicle on opposite sides of said seat cushion, and a second portion extending upwardly on opposite sides of said back cushion; first pivot means secure to a front portion of said seat cushion and to each of said first portions of said side supports, second pivot means secured to an upper end of said back cushion and to said second portion of said side supports; a door hinged to said floor at a front end of said door below said seat cushion and over an opening in said floor; a pair of locking pin mechanisms secured to said vehicle floor opposite a back end of said door; and lock pin mechanisms secured to said second portions of said side supports at a bottom portion of said back cushion, said lock pin mechanisms having locking pins that secure said back cushion in place during normal operating conditions; whereby said pair of locking pin mechanisms release said door at a time of a collision and said lock pin mechanisms release said back cushion at the time of the collision, and a back portion of the seat cushion falls into said opening in said vehicle floor and said back cushion swings free at the bottom portion thereof.

2. A safety system for an occupant of a vehicle as set forth in claim 1, in which said seat cushion is spaced from said door and includes a pair of second pin mechanisms which support the back portion of the seat cushion during normal conditions and which release said back portion of said seat cushion subsequent to the collision whereby the back portion of the seat cushion will fall into the opening in the floor upon the release opening of the door.

3. A safety system for an occupant of a vehicle as set forth in claim 2, in which said system includes a CPU which controls said lock pin mechanisms upon incident of the collision, a battery connected to said CPU, and a collision detector which is connected with said CPU to energize the CPU at the time of the collision.

4. A safety system for an occupant of a vehicle as set forth in claim 1, in which said system includes a CPU which controls said lock pin mechanisms upon incident of the collision, a battery connected to said CPU, and a collision detector which is connected with said CPU to energize the CPU at the time of the collision.

* * * * *